United States Patent [19]
Thompson

[11] Patent Number: 5,003,927
[45] Date of Patent: Apr. 2, 1991

[54] DEMAND TYPE ANIMAL WATERING VALVE

[76] Inventor: Earl C. Thompson, P.O. Box 549, Hewitt, Tex. 76643

[21] Appl. No.: 280,833

[22] Filed: Dec. 7, 1988

Related U.S. Application Data

[63] Continuation-in-part of Ser. No. 159,382, Feb. 23, 1988, abandoned.

[51] Int. Cl.$^5$ .............................................. A01K 7/00
[52] U.S. Cl. ..................................... 119/72.5; 137/271
[58] Field of Search ........................... 119/72, 72.5, 75

[56] References Cited

U.S. PATENT DOCUMENTS

| | | | |
|---|---|---|---|
| 2,834,368 | 5/1958 | Gray | 137/271 |
| 2,939,424 | 6/1960 | Frederiksen | 119/72.5 |
| 3,008,451 | 11/1961 | Curry | 119/72.5 |
| 3,646,955 | 3/1972 | Olde | 137/382 |
| 3,698,431 | 10/1972 | Thompson | 137/604 |
| 3,734,063 | 5/1973 | Atchley | 119/72.5 |
| 3,777,714 | 12/1973 | Danielsson | 119/75 |
| 4,089,350 | 5/1978 | Gustin | 138/45 |
| 4,187,804 | 2/1980 | Taschitzki | 119/72.5 |
| 4,320,891 | 3/1982 | Cairns | 119/72.5 |
| 4,338,884 | 7/1982 | Atcheley et al. | 119/72.5 |
| 4,370,948 | 2/1983 | Atkins | 119/72.5 |
| 4,403,570 | 9/1983 | Freehafer | 119/72.5 |
| 4,416,221 | 11/1983 | Novey | 119/72.5 |
| 4,476,897 | 10/1984 | Morrill | 137/271 X |
| 4,491,088 | 1/1985 | Hostetler | 119/72.5 |
| 4,573,433 | 3/1986 | Thompson | 119/72.5 |
| 4,586,464 | 5/1986 | Agerley et al. | 119/72.5 |
| 4,819,585 | 4/1989 | Dolan et al. | 119/72.5 |

OTHER PUBLICATIONS

Article: "Pig-Nip", Pignip Precision Products, Inc.

Primary Examiner—Robert P. Swiatek
Assistant Examiner—Nicholas D. Lucchesi
Attorney, Agent, or Firm—Daniel Rubin

[57] ABSTRACT

A demand type animal watering valve that is operable by animal mouth actuation of an exposed valve stem. The bulk of the valve including the valve body is comprised of a relatively inexpensive and relatively soft composition that if unprotected would be potentially chewable by the animal when watering. For protecting the soft material at least about the mouth engageable portion of the valve there is provided a mouthguard sleeve of significantly harder chew-resistant metal such as stainless steel. The sleeve is secured to the relatively soft body material in a manner preventing removal separation of the sleeve by the animal. Also disclosed are optional embodiments of a filter screen/orifice plug unit removably insertable in the valve. One embodiment includes a fine mesh screen secured to the inlet side of the plug in which are disposed a plurality of selectively openable parallel orifices for variably setting the desired flow rate of the valve.

29 Claims, 3 Drawing Sheets

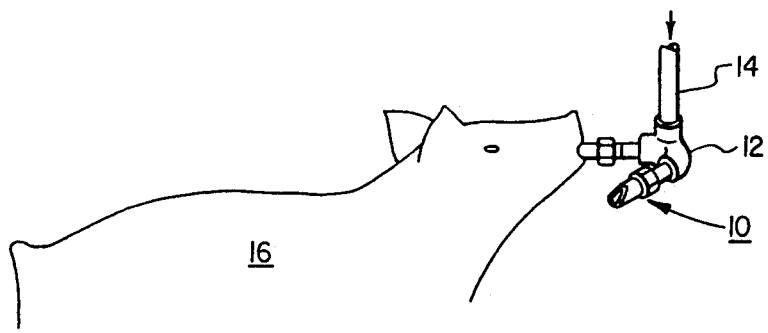
FIG. 1
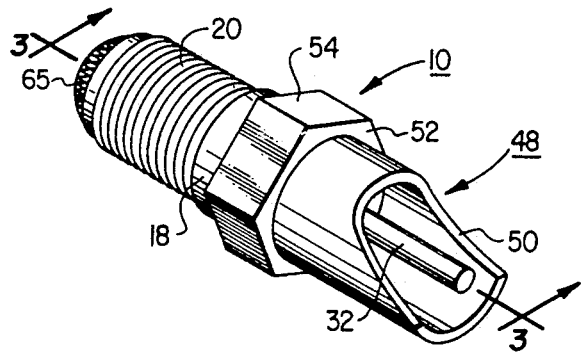
FIG. 2
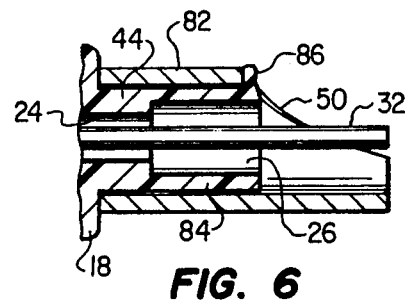
FIG. 6
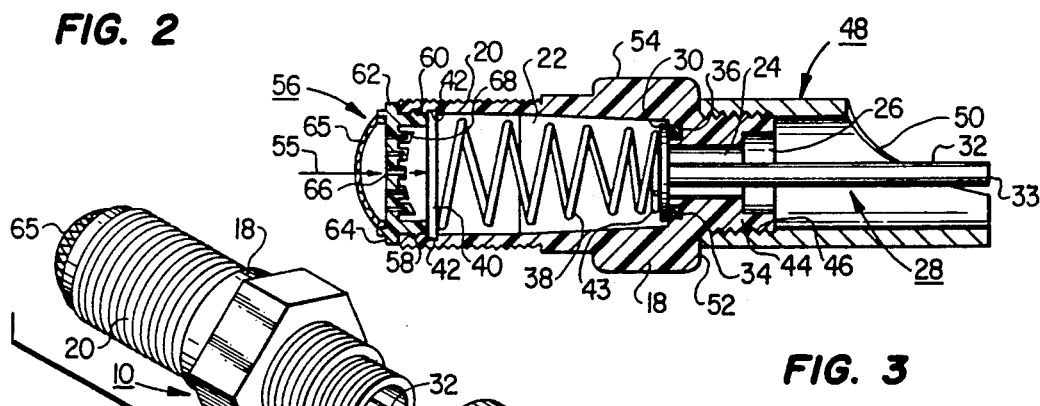
FIG. 3
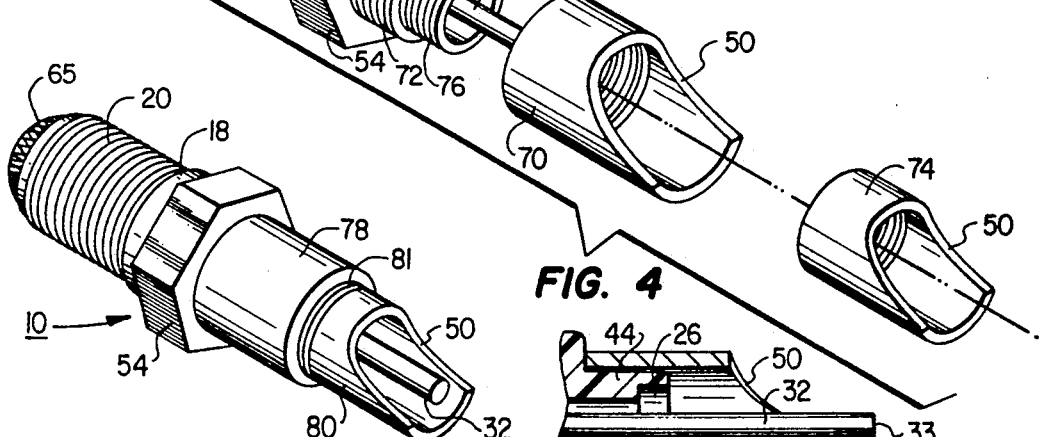
FIG. 4
FIG. 5
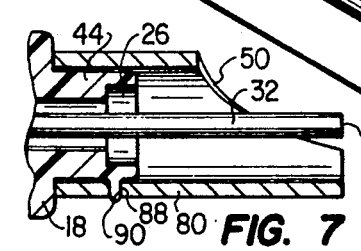
FIG. 7

DEMAND TYPE ANIMAL WATERING VALVE

This application is a continuation-in-part of U.S. Ser. No. 07/159,382 filed Feb. 23, 1988, now abandoned.

FIELD OF INVENTION

The field of art to which the invention pertains comprises the art of animal actuated watering devices for relatively small animals such as swine.

BACKGROUND OF THE INVENTION

In recent years, the dispensing of fresh water to fowl or small animals has increasingly been provided by the use of demand actuated water dispensers directly connected to a fresh water supply. A dispenser adapted for watering swine is generally comprised of a metal valve secured to a water supply line and formed of a corrosion resistant metal. Included in the valve is a displaceable valve actuator in the form of a spring biased elongated stem extending beyond the valve body at its distal end. The animal wanting to drink envelopes his mouth about the valve end and displaces the distal end of the stem. The stem is capable of being displaced by the animal in opposition to a light spring force to an offset position during which fresh water is automatically dispensed. The animal soon learns to operate the valve by tongue and when drinking is completed the stem is released enabling a spring force to revert the stem to its shutoff relation.

In order to control the flow rate of water being dispensed when the valve is actuated, it has been known to utilize various intervening control devices such as an adjustable orifice plug in which the flow area can be selectively varied on site. An adjustably settably device for varying the rate of water flow is disclosed in U.S. Pat. No. 4,370,948. Most commonly, the water source to be passed by the valve is well water from which filtering of sediment or ground particulates if any has been minimal. Consequently, there has been a tendency for the initially open orifice to become constricted or even blocked in service so as to require frequent maintenance in the form of replacement or cleanout as appropriate.

Exemplifying demand-type animal watering devices of the prior art are the disclosures of U.S. Pat. Nos. 2,939,424; 3,777,714; 3,698,431; 4,187,804; 4,370,948; 4,416,221; 4,491,088 and 4,573,433.

Because swine in particular are inclined to eat or at least chew almost anything that is chewable including soft metal or plastics, the tendency in the industry has been to form valves of stainless steel which is both too hard to be edible or chewable and yet very resistant to corrosion. Valves of that type are commercially available under the trademark Pig Nip. While stainless steel has been highly suitable for the end purpose, stainless steel as a base commodity has recently incurred some substantial price increases. The price increases have of course been passed on to the fabricator and then to the consumer and as a result the market price of the finished valve has increased significantly beyond the price at which it was previously available.

While the industry is well aware of the problem, it has not been heretofore known how to reduce material costs while rendering the valve inedible or chew resistant to the animals for which they are provided.

SUMMARY OF THE INVENTION

The invention relates to demand type animal watering devices. More specifically, the invention relates to animal watering valves of the demand type that are inedible and unchewable and yet are less costly to manufacture than comparable purpose valves of the prior art.

The foregoing is achieved in accordance with the invention by means of a valve construction having a body comprised of a relatively soft but uncostly composition such as a molded polymer plastic. Securely attached to the body about the areas exposed to the mouth of the animal during valve operation is a sleeved mouthguard of stainless steel enveloping or extending from the discharge end of the body. The operating stem remains exposed at the distal end as before. Being that the mouthguard shield is of a hard stainless steel composition it can readily withstand any chewing efforts by the animal. Yet the body per se, representing the bulk of the material content utilized in fabricating the valve, is of a lesser expensive molded plastic composition inaccessible to the animal's mouth and teeth.

Various configurations and sizes are provided so as to afford a variety of optional models from which the farmer or animal raiser can select the model most suitable for his needs. Also included are various attachment structures by which the mouthguard can be secured to the body so as to preclude pulloff by the animal. Along with the foregoing there is a provided a novel screen/orifice unit combination enabling orifice size to be selected on site while having a permanently placed screen for filtering out any sediment or other particulate impurities contained in the water supply. Also provided are alternate orifice devices affording selectively variable settings for controllably regulating the input water rate through the valve and which can conveniently be adjustably preset on site.

It is therefore an important aspect of the invention to provide a novel construction for a demand-type watering valve for animals.

It is a further important aspect of the invention to effect the previous aspect with a construction that is less costly to fabricate than comparable purpose valves of the prior art and which is substantially if not totally unchewable by the animal for the which the valve is to be provided.

It is a yet further important aspect of the invention to provide a novel strainer/orifice plug for the valve of the previous objects that is more filter effective while being more conveniently and less expensively serviced than comparable purpose units of the prior art.

It is a still further important aspect of the invention to afford an adjustable orifice unit for variably regulating the dispensed flow rate through the valve.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIG. 1 is an isometric view of the installed valve of the invention;

FIG. 2 is an isometric enlarged view of a first embodiment of the valve structure of the invention;

FIG. 3 is a sectional view as seen substantially from the position 3—3 of FIG. 2;

FIG. 4 is an exploded isometric view of a dual sized unit in accordance with a second embodiment for the valve of the invention;

FIG. 5 is an isometric view of a third embodiment for the valve of the invention;

FIGS. 6 and 7 are fragmentary sectional views of alternate embodiments by which the unchewable mouthguard is attached to a plastic body for the valve hereof;

DETAILED DESCRIPTION OF THE PREFERRED EMBODIMENT

Figure 8:
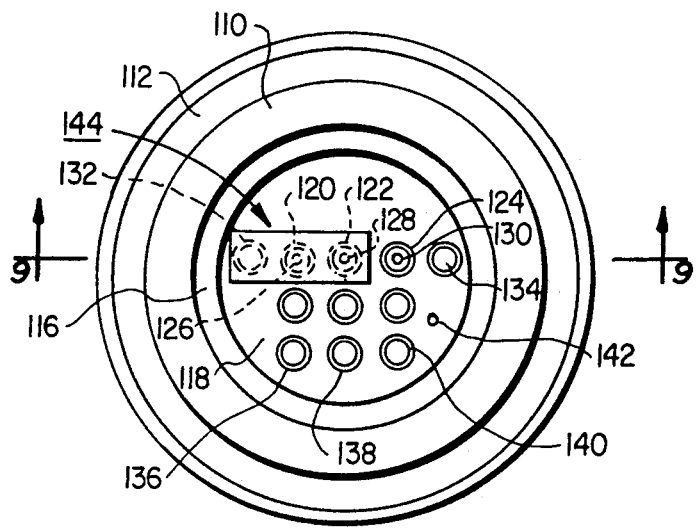
FIG. 8 is a topside plan view of a first alternate filter and orifice unit for the valve of the invention with the filter screen removed.

In the description which follows, like parts are marked throughout the specification and drawings with the same references numerals respectively. The drawing figures are not necessarily to scale and in certain views parts may be drawn rotated into the plane of the drawing for purposes of clarity.

Referring first to FIG. 1, there is illustrated a pair of valves in accordance herewith designated 10 joined via a fitting 12 to a water supply pipe 14. A hog 16 is shown operating one of the valves 10 as will be described and which may for example be operationally similar to a valve commercially marketed as a PIG NIP (R) playguard.

Referring to FIGS. 2 and 3, valve 10 of this embodiment is comprised of a tubular body 18 of soft metal or polymer plastic composition having threads 20 for mounting to a suitable fitting 12. The interior of the body is hollow to define a flow passage 22 communicating downstream thereof with a relatively small diameter bore 24 which in turn merges with an enlarged counterbore 26 in a nose end 44.

Positioned at the forward downstream end of the flow passage 22 is an operating stem 28 usually formed of alloy corrosion resistant metal such as stainless steel. The stem is comprised of a cross head 30 transversely joined to an elongated stem 32 concentrically disposed in bore 24 and extending to an exposed distal end 33. Disposed in body 18 opposite the downstream face of head 30 is an annular concentric groove 34 containing an emerging resilient 0-ring gasket 36. Securing O-ring 36 in groove 34 serves to maintain the O-ring in position in the event of a valve freeze or when exposed to relatively high water pressures. Head 30 cooperates with gasket 36 for closing and opening the valve to flow by operation of stem 32 as is well known.

Biasing head 30 into the closed relation against gasket 36 is a compressed coil spring 38 forwardly tapered from a large diameter 40 secured in groove 42 to a reduced diameter at closed end 43 slightly less than the diameter of head 30 thereat. This enables the spring force to be directed primarily at the center of head 30 for ease of operation as will be understood. It also serves as a stop to maintain the stack relation of components and prevent push out of orifice plug 56 by a hog pushing against stem end 33.

For protecting the plastic nose end 44 of body 18 from the potential adverse chewing of a hog 16, the body nose end 44 includes threads 46 unto which there is secured a sleeved stainless steel mouthguard 48. The mouthguard has a top longitudinal portion 50 cutaway so as to expose stem end 33 to the tongue or teeth of a hog 16 demanding water therefrom. By means of male threads 46 on body 18 engageable with complementary female threads on sleeve 48, the sleeve 48 can be readily advanced quickly to a shoulder 52 of a hexnut at which the sleeve will be retained. The integral hexnut 54 is useful for wrenching the valve threads 20 into a fitting 12. For larger hogs it is preferred that mouthguard 48 be of at least 1/16 inch thickness while for smaller pigs about 1/32 inch thickness is normally adequate.

Operating the valve 10 so as to permit water 55 to be dispensed is effected by an animal directionally displacing stem end 33 for head 30 to be removed from the closed engagement against gasket 36. For both filtering and controlling the dispensing rate of the water supply permitted to enter chamber 22 during the open position of the valve, there is provided at the rearward end of body 18 a combination strainer and orifice plug 56. The plug per se is integrally of an all plastic composition having an annular bead 58 adapted to be inserted or cold flowed into an annular internal body recess 60. The recess is dimensionally located so as to enable the face of flange 62 to overlie the body end face thereat.

Included on the upstream inlet face of the plug 56 is an annular lip 64 to which the bottom edge of a dome shaped filter screen 65 is secured in a compressive interfit therewith. Screen 65 could be of either plastic or metal and preferably should be of about 40 mesh size. If of metal, it should of course be corrosion resistant such as afforded by stainless steel. Adherence of the screen to the lip 64 can be further enhanced by localized heating of the lip against the screen or by use of limited quantities of a suitable adhesive. Formed in the central portion of the plug is a plurality of small diameter orifices 66 all of which except the most center orifice are originally capped by a cutoff form of elongated orifice tube 68.

In this arrangement the orifice tubes preferably extend from the downstream face of plug 56. Any number of orifice tubes 68 can be cut off on site in order to exercise control over the water rate that will flow through the opened parallel orifices to outward of guard 48. Also preferred in this arrangement, is that the orifice plugs toward the perimeter are slightly longer in dimension than those toward the interior or center which are gradually reduced in length from the perimeter to the shortest plug at the center orifice. By this means, users of the orifice plug 56 can more conveniently cut off tips of those orifice tubes at the orifices 66 progressively selected for increasing flow without the necessity of removing screen 65. Alternatively, the orifice tubes could be progressively stepped with a shoulder in other geometric relationships as will be described. One such possibility is to have different orifice sizes with the center orifice being the largest (1/64 inch) and longest.

For the embodiment of FIG. 4, the construction is essentially similar to that described above except for the provision of dual sizing that can be optionally selected on site for larger or smaller animals. In this arrangement a larger stainless steel guard 70 can be threadedly mounted onto larger diameter threads 72 or alternatively a smaller diameter sleeve 74 can be threadedly mounted on the stepped down smaller diameter threads 76.

For the embodiment of FIG. 5 a still smaller diameter mouthguard 80 is provided. For this construction, integral plastic body 18 is injection molded so as to include a tubular sleeve extension 78 merged integrally with the front face of nut 54. The sleeve is internally threaded (not shown) to receive a smaller diameter version of stainless steel mouthguard 80 through which stem 32 projects outwardly as before. For these purposes, tube 80 is externally threaded at 81 for threaded mounting within sleeve 78. It is also of an overall length so as to extend sufficiently beyond the sleeve to preclude the possibility of the animal's mouth reaching the body. Where utilized for smaller pigs, the length of sleeve 78 can be shortened and sleeve 78 might even be eliminated.

In each of FIGS. 6 and 7 there is disclosed alternate means by which the stainless steel mouthguard can be securely adhered to the body nose end 44 in a manner preventing pull off or separation of the guard from the body 18 by a hog 16 during drinking. For each of these embodiments, the nose end 44 of body 18 is threadless as is the sleeve guard 82 to be slip fit thereon. For purposes of effecting attachment in the embodiment of FIG. 6, the nose end 44 includes an integral tubular extension 84 that when guard 82 is slipped thereover will partially extend into the region of cutaway 50. By means of a hot iron, torch or the like, an arcuate portion of the end face of extension 84 can be caused to heat flow as shown at 86 so as to overlay the end face of cutaway 50 thereat in an interlock relation. Once cooled, the flowed plastic 86 will extend over a substantial portion of the guard edge defining cutaway 50 so as to inhibit any tendency to pull off the stainless steel guard 82 from the plastic tubular extension 84.

In the embodiment of FIG. 7, one or more radial apertures 88 are formed as by drilling through sleeve guard 80. After slip on over nose end 44 the assembled unit is locally heated in the vicinity of the apertures so as to permit plastic tear-drop 90 to form within aperture 88. This similarly produces an interlock against pulloff of the guard sleeve 80. Obviously other well known forms of attachment can be utilized for this purpose such as cross pins, screws, adhesive, etc. alone or in combination with the foregoing.

Figure 9:
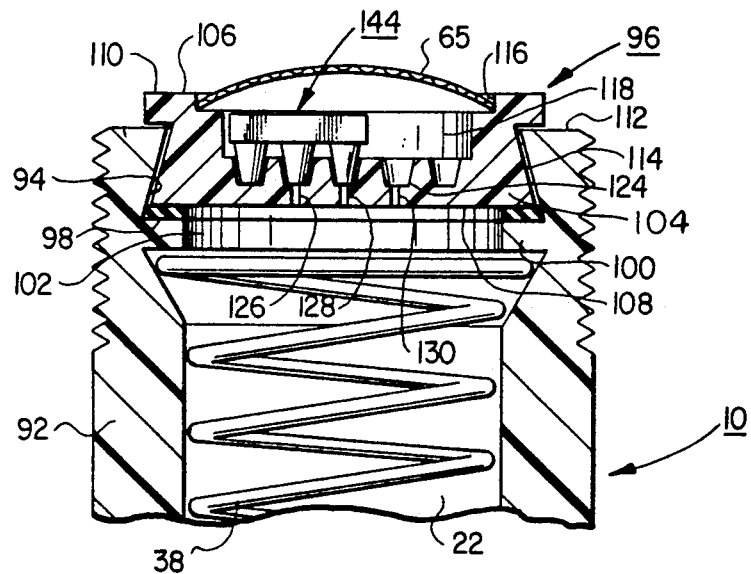
FIG. 9 is a fragmentary sectional elevation view as seen substantially from the position 9—9 of FIG. 8.
Figure 10:
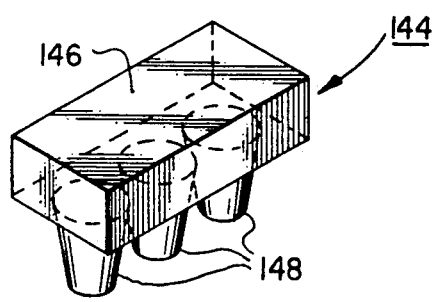
FIG. 10 is perspective view of the displaceable orifice plug for the orifice unit of FIG. 8.

A first alternate device for both filtering and controlling the dispensing rate of the water supply through valve 10 is illustrated in FIGS. 8-10. For this construction the valve 10 has a body 92 generally similar to body 18 but modified to define an outwardly tapered annular inlet 94. Received in inlet 94 is a complementary orifice plug 96 adapted to be snapped in a dovetail interfit into inlet 94 in a sealing engagement against an annular gasket 98. Providing an annular seat for plug 96 is the ledge formed on an internal radial rib or protrusion 100 having a central aperture 102 communicating with downstream passage 22. Spring 38 for this construction, is enlarged at the upper end for seated containment against the underside of rib 100.

Comprising annular plug 96 is a body 104 extending between an inlet face 106 and an outlet face 108. A flange 110 is adapted to seat against the end face 112 of body 92 and merges with an annular reverse taper 114 leading to outlet face 108. When in position within inlet 94, it is evident plug 96 is in a dovetail interlock against outward displacement by either an imposed back pressure or a reverse flow should that occur.

Concentrically defined at the inlet of plug body 104 is a first shallow bore 116 merging with a downstream counterbore 118. A filter screen 65 as above is secured in bore 116. Defined extending from the upper surface of counterbore 118 are three uniformly spaced frusto-conical inlet bores 120, 122 and 124 leading respectively to flow orifices 126, 128 and 130. In a preferred construction the latter orifices are of different diameters such as 1/32, 1/16 and $\frac{1}{8}$ inch respectively.

In horizontally linear alignment (FIG. 8) with the inlet-orifices located uniformly spaced on either side, for use in combination therewith as will be described, are blind inlet bores 132 and 134 which are devoid of an associated orifice. Additional blind inlets 136, 138 and 140 for use with the inlet-orifices are defined uniformly spaced in pairs and arranged vertically with respect to the individual inlet orifices 120, 122 and 124. Also provided in plug body 104 separated from the foregoing is a small diameter permanently open orifice 142 of about 1/64 inch diameter.

Adapted to cooperate with the various inlet-orifices and blind inlet bores in different row cluster combinations for selective regulation of water flow is a displaceably removable plug cap 144 comprised of a rectangular base 146 and three uniformly spaced, row aligned frusto-conical protuberances 148 downwardly dependent from the underside of the base. The geometric relationship and spacing of the protuberances correspond to any selected inlet bore combination of plug 96 in which they are to be inserted. That is, with cap 144 disposed in counterbore 118 in the manner of FIG. 9, only orifice 130 is exposed to water flow with the remaining orifices being sealed against flow. Inserting the protuberances into inlet-orifice 120/126 in combination with blind inlets 136 enables both orifices 128 and 130 to be opened for flow. Other placement combinations of the cap protuberances enable none, or any one, two or all three of the inlet-orifices to be opened to water flow. By the mere removal and reinsertion of cap 144, the selected of the operatively parallel inlet-orifices can be utilized to best meet the local on-site requirements. Changes can be readily effected subsequently whenever needed to either increase or decrease the dispensing rate. For this embodiment, screen 65 will require removal whenever access to plug cap 144 becomes necessary.

Figure 11:
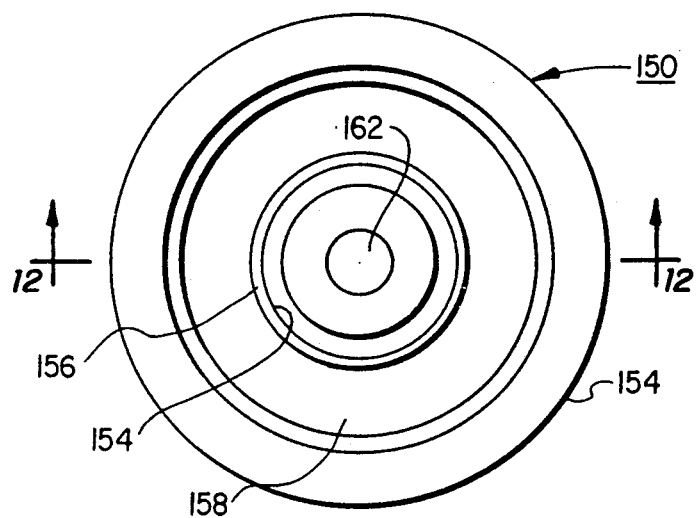
FIG. 11 is a topside plan view of a second alternate filter and orifice unit for the valve of the invention with the filter screen removed.
Figure 12:
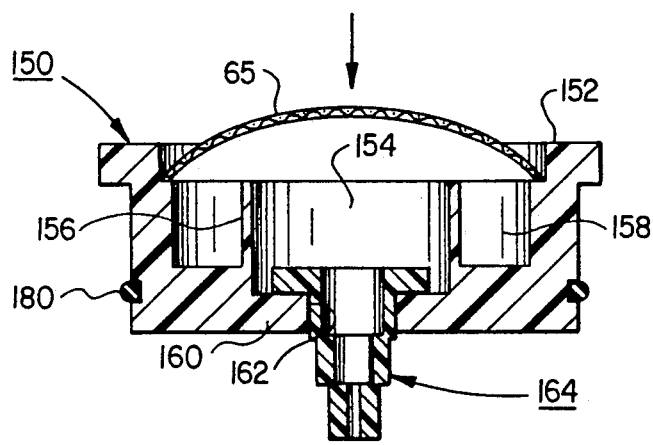
FIG. 12 is a fragmentary sectional elevation as seen substantially from the position 12-12 of FIG. 11.
Figure 13:
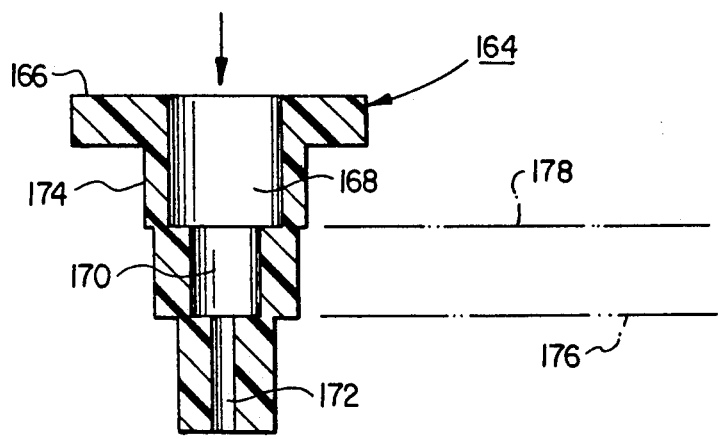
FIG. 13 is an enlarged sectional elevation of the removable orifice plug of FIG. 12.

A second alternate device for both filtering and controlling the dispensing rate of the water supply through valve 10 is illustrated in FIGS. 11-13. For this embodiment, the device is designated 150 and comprises an orifice body plug of all plastic composition adapted to be received in body 18 in the manner of plug 56 described supra.

The body plug 150 includes annular flange 152 surrounding a first central recess 154 defined within an annulus 156. A second annular recess 158 is defined surrounding annulus 156. Formed in the bottom wall 160 of body plug 150 within the confines of recess 154 is a thru-port 162 in which to receive a removable and severable soft plastic orifice plug 164. Port 162 will typically be of $\frac{1}{8}$ inch diameter. Annular rib 180 provides for a snap-in interlock of body plug 150 in valve body 18.

The removable and severable orifice plug 164, as best seen in FIG. 13 is comprised of a radial flange 166 adapted to seat against the bottom wall of recess 154 overlying port 162. Axially extending through the plug is a stepped diameter flow passage comprised of a first diameter 168, a second diameter 170, and a third diameter 172. For the purposes hereof, the diameters of the flow passages 168, 170 and 172 are 1/16, 1/32 and 1/64 inch respectively. The shank 174 surrounding flow passage 168 is of course sized to be received within thru-port 162. Obviously, the sizes for the various flow passages could readily be varied to suit.

Using the plug 164 unsevered as thus far described, affords minimum flow by virtue of the maximum restriction imposed by the reduced diameter of passage 172. To increase the flow rate, the tip containing passage 172 can be severed along the first cut line 176 so as to expose and render passage 170 the distal outlet. Further increase in flow rate can similarly be effected by severing the remaining tip along cut line 178. An even further increase in flow rate can be achieved by removing plug 164 so as to expose the thru-port 162. Rather than orifice plug 164 being removable relative to plug body 150, the plug and body could optionally be formed as an integral unit.

By the above description there is disclosed a novel watering valve for small animals that is demand operable by the animal. By virtue of its construction, it maintains the operational qualities and corrosion resistance previously provided by the all stainless steel valves of the prior art. Yet by constructing the bulk of the valve components of a composition such as molded plastic that is significantly less costly than stainless steel, the ultimate manufacturing cost of the valve is significantly reduced. Still by virtue of the stainless steel mouthpiece for envelopment by the animal's mouth during drinking, the unchewable firmness and hardness integrity of stainless steel is preserved so as to overcome the longstanding chew problem associated with hog watering. Whereas stainless steel is the preferred mouthpiece composition, other hard metals including cast iron could be utilized in the alternative.

As a further virtue hereof, the valve body can be formed in various embodiments so as to permit optional selection of different sized stainless steel mouthguards to be applied. Not only does the latter represent a versatility not previously known in the art, but the plastic composition of the body per se can comprise a basis for forming an interlock between the stainless sleeve mouthguard and body for preventing their relative separation during drinking by the animal. While thermal plastic has been mentioned as the preferred composition for body 18 it will be appreciated that other materials could just as readily be used and substituted therefor. Suitable polymers for the body hereof can include acetal, nylon, polycarbonate, ABS, polyester, etc. or combinations thereof. Alternate materials could even include soft metals such as brass, copper, aluminum or pewter.

Moreover, there has been disclosed as part of the invention hereof novel forms of orifice plug that not only provide selective sizing of the water passage for the water rate to be maintained through the valve but at the same time includes a screen filter whereby particulates in the water supply such as might be contained in well water will be filtered out ahead of the orifices. Any time during which the water supply rate is desired to be increased, the plug can be conveniently removed from the valve body and in a first embodiment additional orifice tubes cut off to expose additional flow area. In a first alternate embodiment, the various orifice sizes can be selectively utilized by appropriate blocking of the unwanted orifices via a variably displaceable plug. For periodic cleaning of the screen, the plug can be similarly removed. In a second alternate embodiment, the various orifice sizes are longitudinally stepped in a series flow within a single plug. Progressively severing portions of the plug along prescribed cut lines enables the outlet diameter to be progressively increased.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. In a demand operable watering valve for animals including:
   a tubular body in which the operative components, of the valve are supported, said body being of a first composition defining an inlet end communicating with a flow passage and adapted for connection to a water supply conduit;
   a gasket positioned about said flow passage internally of said body; and
   operating means supported within said body and cooperating with said gasket to be positionable in a first relation engaging said gasket to prevent water flow outward of said body and to be positionable in a second relation at least partially removed from said gasket to permit water flow received at said inlet end to be dispensed outward of said body;
   said operating means including an elongated actuator stem extending from its support within said body to outward of said body and displaceable from a distal end for changing the position of the operating means between said first and second relations; the improvement comprising:
   a relatively short length of a sleeved mouthguard comprising a component separate and functionally independent of said body but secured to the outlet end of said body for protecting a valve portion thereat while exposing the distal end of said stem for potential mouth actuated displacement of said stem by an animal for whom the water is to be demanded;
   said mouthguard being of a second composition having hardness properties significantly greater than the hardness properties of said first composition and having a bulk relatively less than the bulk of said first composition.

2. In a watering valve in accordance with claim 1 in which the hardness of said second composition is at least sufficient to render said mouthguard substantially chew resistant to animals for which the valve is to be provided.

3. In a watering valve in accordance with claim 2 in which the hardness of said second composition is substantially chew resistant to hogs.

4. In a watering valve in accordance with claim 3 in which said second composition comprises stainless steel.

5. In a watering valve in accordance with claim 4 in which said first composition at least partially comprises a molded polymer plastic.

6. In a watering valve in accordance with claim 5 in which said first composition is selected from the group consisting of acetal, nylon, polycarbonate, polyester of ABS alone or in combination.

7. In a watering valve in accordance with claim 3 in which said second composition comprises cast iron.

8. In a watering valve in accordance with claim 4 in which said first composition at least partially comprises a relatively soft metal.

9. In a watering valve in accordance with claim 8 in which said first composition is selected from the group consisting of brass, copper, aluminum or pewter.

10. In a water valve in accordance with claim 1 wherein said improvement further comprises a unitized combination of an orifice and filter preassembled together for unit placement at the inlet end of said body for both filtering and regulating the flow rate quantities of water to be supplied through said body, said unitized combination including a filter, a variably settable orifice and means for securing said filter and said orifice together in a unitized relation.

11. In a watering valve in accordance with claim 10 in which said unitized combination is comprised of an annular plug body removably disposed in an interfit within the tubular portion of said valve body and including at least one control sized flow orifice extending through said plug body and said filter is secured to said plug body in a filter relation about the upstream inlet of said at least one orifice.

12. In a watering valve in accordance with claim 11 in which said filter comprises a fine mesh screen.

13. In a watering valve in accordance with claim 12 in which said plug body includes a plurality of orifices adapted to effect parallel flow of water received from the connected water supply and at least some of said orifices are sealed against flow by a cut-offable cover tube for selectively varying the flow rate to said valve.

14. In a watering valve in accordance with claim 13 in which said cover tubes are dimensionally stepped longitudinally in the downstream direction in a selected geometric arrangement.

15. In a watering valve in accordance with claim 10 in which said unitized combination is comprised of an annular plug body secured in a dovetail interfit within the tubular portion of said valve body and including at least one control sized flow orifice extending through said plug body and said filter is secured to said plug body in a filter relation about the upstream inlet of said at least one orifice.

16. In a watering valve in accordance with claim 12, in which said plug body includes a plurality of orifices adapted to effect parallel flow of water received from the connected water supply and a displaceable closure member separate of said plug body that operably cooperates with said orifices by selectively sealing at least some of said orifices against flow for variably presetting the regulated flow rate to said valve.

17. In a watering valve in accordance with claim 16 in which said plug body includes a plurality of inlet bores communicating with respective of said plurality of orifices subject to being sealed, and said closure member includes a protuberance adapted for detached placement into the inlet bore of an orifice to be sealed.

18. In a watering valve in accordance with claim 17 in which said plurality of orifices subject to being sealed are individually sized different from each other, there is included a plurality of blind inlet bores spaced about the inlet bores of said orifices and said closure member includes a plurality of protuberances adapted to be selectively placed in a combination of said inlet bores and said blind inlet bores for variably setting the selected regulating flow rate sought to be achieved.

19. In a watering valve in accordance with claim 18 in which said annular plug body includes at least one permanently open orifice and said closure member can be placed in said inlet bores and said blind inlet bores so as to seal various combinations of said sealable orifices for incrementally varying the flow area of said plurality of orifices between fully open and fully closed.

20. In a watering valve in accordance with claim 10 in which said unitized combination is comprised of an annular plug body removably disposed in an interfit within the tubular portion of said valve body and defining a central thruport, an orifice plug extending through said thruport and comprised of a plurality of integral shank sections internally containing progressively stepped down reductions in flow diameter toward the distal end enabling flow area to be increased by severing of said shank sections and said filter is secured to said plug body in a filter relation about the upstream inlet of said orifice plug.

21. In a watering valve in accordance with claim 20 in which said orifice plug extends removably disposed in said thruport.

22. In a watering valve in accordance with claim 1 wherein said improvement further comprises securement means securing said mouthguard to said body so as to resist their axial separation by an animal user of the valve.

23. In a watering valve in accordance with claim 22 in which said securement means comprises a lateral threadless interlock effected between at least a portion of said body and at least a portion of said mouthguard.

24. In a watering valve in accordance with claim 23 in which the outlet end of said body and said mouthguard are secured in at least a partially overlapping relation and said securement means comprises a lateral projection of said body interposed in the separation path of said mouthguard.

25. In a watering valve in accordance with claim 1 in which said protected valve portion comprises said body.

26. A unitized combination comprising an orifice plug and filter preassembled together for unit placement onto a water dispensing valve and comprising an annular plug body including a plurality of control sized flow orifices defined extending through said body and adapted to effect parallel flow of water received from the connected water supply, a filter comprising a fine mesh screen secured to said plug body in a filter relation about the upstream inlet of said orifices, a displaceable closure member separate of said plug body having at least two spaced protuberances to selectively interfit and seal at least some of said orifices against flow for variably presetting the regulated flow rate to said valve and means effecting an interfit between said filter and said plug body for securing said filter and said plug body together in a unitized relation.

27. An orifice plug and filter unit in accordance with claim 24 in which said plug body includes a plurality of inlet bores communicating with respective of said plurality of orifices subject to being sealed, and the protuberance of said closure member are adapted for detached placement into the inlet bore of the orifices to be sealed.

28. An orifice plug and filter unit in accordance with claim 27 in which said plurality of orifices subject to being sealed are individually sized different from each other, there is included a plurality of blind inlet bores spaced about the inlet bores of said orifices and said closure member includes a plurality of protuberances adapted to be selectively placed in a combination of said inlet bores and said blind inlet bores for variably setting the selected flow rate sought to be achieved.

29. An orifice plug and filter unit in accordance with claim 28 in which said annular plug body includes at least one permanently open orifice and said closure plug member can be placed in said inlet bores and said blind inlet bores so as to seal various combinations of said sealable orifices for incrementally varying the flow area of said plurality of orifices between fully open and fully closed.

* * * * *